Dec. 24, 1940.  H. F. SCHMIDT  2,226,412
POWER ABSORBING OR TRANSMITTING DEVICE
Filed June 4, 1938   3 Sheets-Sheet 1

WITNESSES:
James X. Mosser
F. E. Dunderdale

INVENTOR
HENRY F. SCHMIDT.
BY
A. B. Ravis
ATTORNEY

Dec. 24, 1940.  H. F. SCHMIDT  2,226,412
POWER ABSORBING OR TRANSMITTING DEVICE
Filed June 4, 1938  3 Sheets-Sheet 2

WITNESSES:

INVENTOR
HENRY F. SCHMIDT.
BY
ATTORNEY

Dec. 24, 1940.   H. F. SCHMIDT   2,226,412
POWER ABSORBING OR TRANSMITTING DEVICE
Filed June 4, 1938   3 Sheets-Sheet 3

WITNESSES:

INVENTOR
HENRY F. SCHMIDT.
BY
ATTORNEY

Patented Dec. 24, 1940

2,226,412

UNITED STATES PATENT OFFICE 2,226,412

POWER ABSORBING OR TRANSMITTING DEVICE

Henry F. Schmidt, Lansdowne, Pa., assignor to Westinghouse Electric & Manufacturing Company, East Pittsburgh, Pa., a corporation of Pennsylvania Application June 4, 1938, Serial No. 211,829

9 Claims. (Cl. 188—90)

My invention relates to hydraulic power transmitting or absorbing devices and it has for an object to provide apparatus of this character which is fabricated in order to facilitate manufacture and reduce the cost thereof.

More particularly, apparatus of this character usually embodies a rotor and casing or secondary element having opposed radial faces provided with opposed cups or pockets arranged so that the cups or pockets of the rotor act somewhat as the passages of a centrifugal pump runner to deliver liquid moving at high velocity to the cups or pockets of the casing or secondary element, the liquid providing a means either for the absorption of power derived from the rotor or for the transmission of power from the rotor to the casing or secondary element. Usually, with apparatus of this character, the cups or pockets are formed with smoothly curved bottom surfaces in order to minimize friction and to secure smooth outward flow in the rotor pockets and smooth inward flow in the casing pockets without eddying; however, difficulty is encountered in the fabrication of a rotor and a casing to provide pockets having the theoretically desired surfaces. In accordance with my invention, and bearing in mind that, with apparatus of this character, the power absorbed increases as the fifth power of the diameter, I have proceeded on the basis that sacrifice in efficiency to provide a construction which may be fabricated may be easily compensated for by making the construction slightly larger in diameter. In other words, my improved fabricated device is equally as effective as one having cups or pockets with properly curved bottom surfaces, the lessened efficiency of the fabricated cups or pockets being compensated for by the slightly larger diameter of the construction.

In accordance with my invention, therefore, the rotor and casing constructions have laterally opposed annular channels forming an approximately toroidal space, each construction comprising a plurality of circumferentially-extending plate elements, including frusto-conical plate elements, welded together to form its channel such that the toroidal space formed by opposed channels is polygonal in cross-section with sides thereof formed by said plate elements and also comprising vanes welded to the plate elements forming its channel and dividing the latter transversely into a circumferential series of pockets such that pockets of the opposed channels provide spaces for the circuitous travel of liquid about the toroidal axis under the influence of centrifugal force due to movement of the rotor construction.

A further object of my invention is to provide apparatus of the above character wherein the cups or pockets of the rotor and casing constructions are formed by cylindrical, frusto-conical, and radial plate elements welded together and providing opposed annular channels and by vanes extending transversely of the channels and welded to the plate elements.

These and other objects are effected by my invention as will be apparent from the following description and claims taken in accordance with the accompanying drawings, forming a part of this application, in which:

Figure 4:
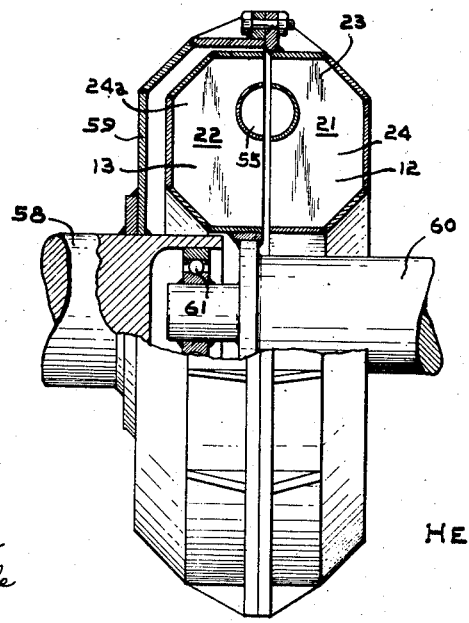
Fig. 4 is a view showing the improvement embodied as a hydraulic coupling.

Referring now to the drawings more in detail, there is shown a rotor construction, at 10, and a casing construction, at 11, the constructions having circumferential series of opposed cups or pockets 12 and 13, respectively, the rotor pockets functioning after the manner of the passages of a centrifugal pump and supplying liquid to the casing pockets in order that power may be absorbed or transmitted from the rotor to the casing construction. This general type of apparatus may be used, therefore, either as a hydraulic dynamometer, in which case the casing construction would be constituted as a scale beam in order that the torque may be measured, or as a coupling, in which case the casing construction would be the driven element. Accordingly, in Figs. 1, 2 and 3, my improvement is shown in connection with a dynamometer or hydraulic brake, whereas Fig. 4 shows the improvement embodied as a hydraulic coupling.

Figure 1:
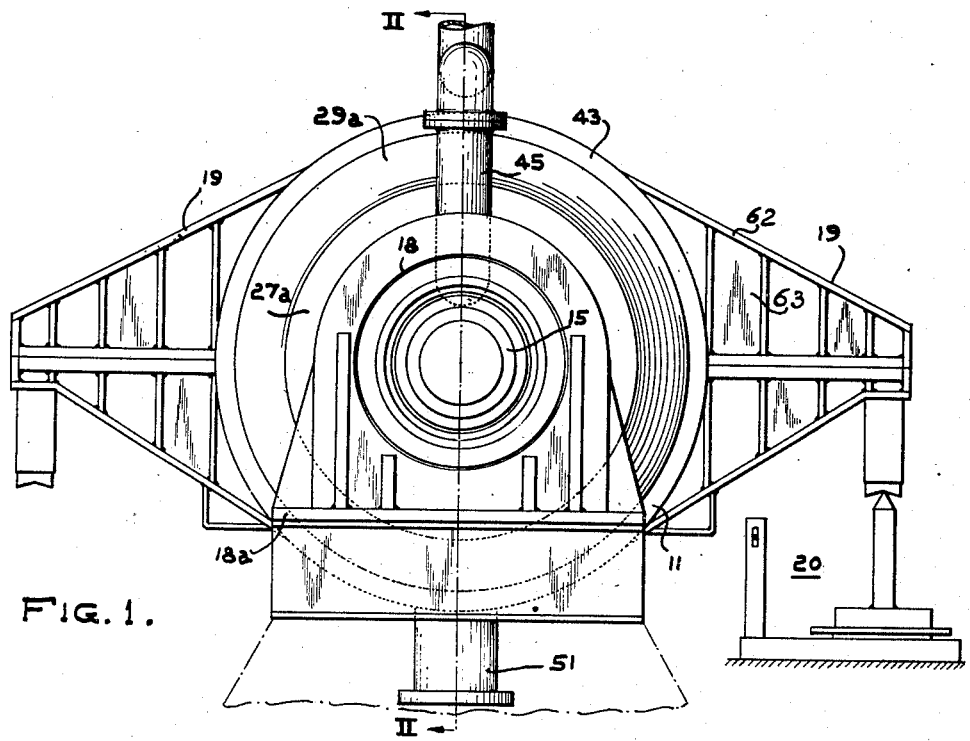
Fig. 1 is a side elevation of my improved apparatus.
Figure 2:
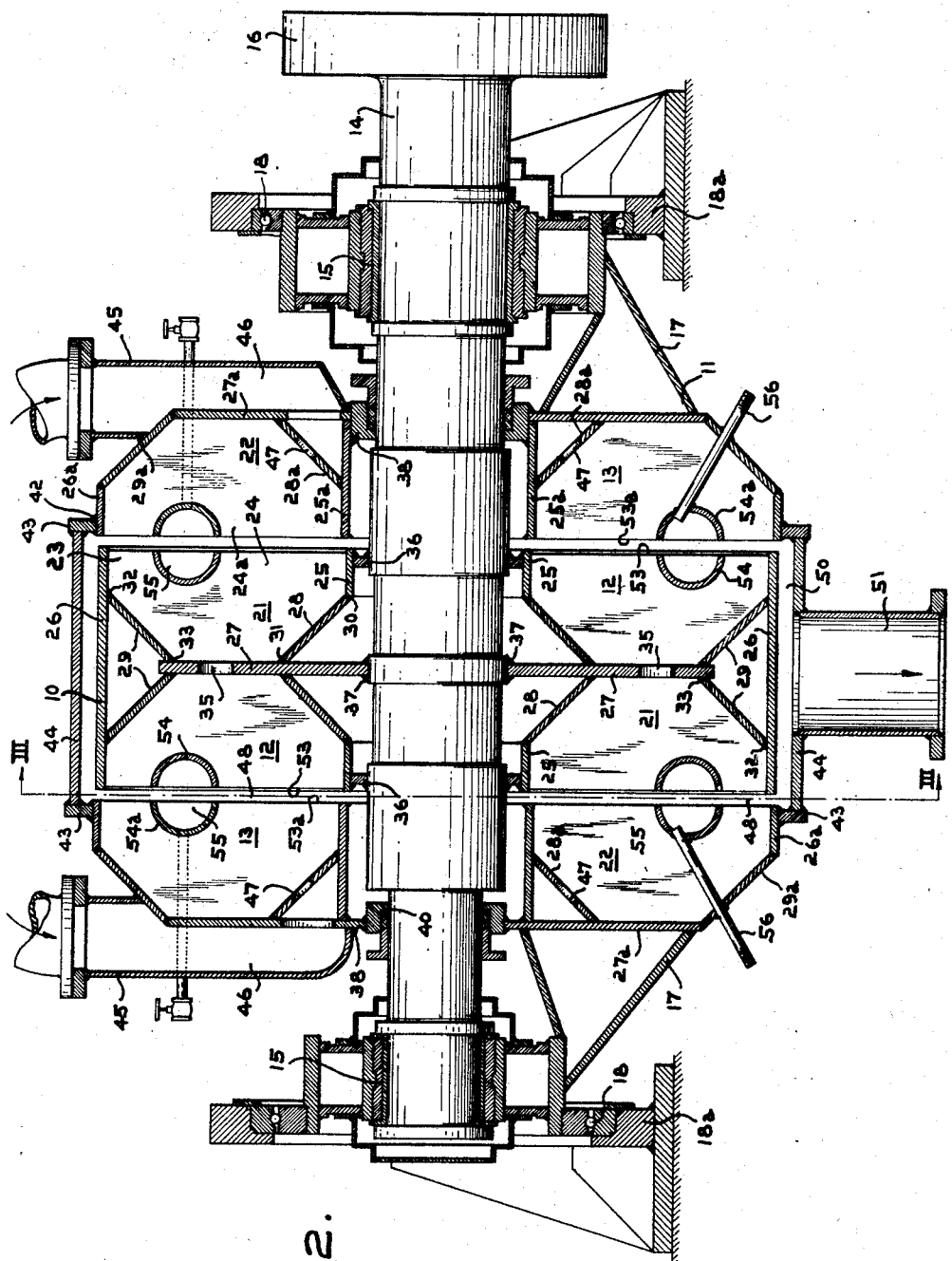
Fig. 2 is a sectional view taken along the line II—II of Fig. 1.
Figure 3:
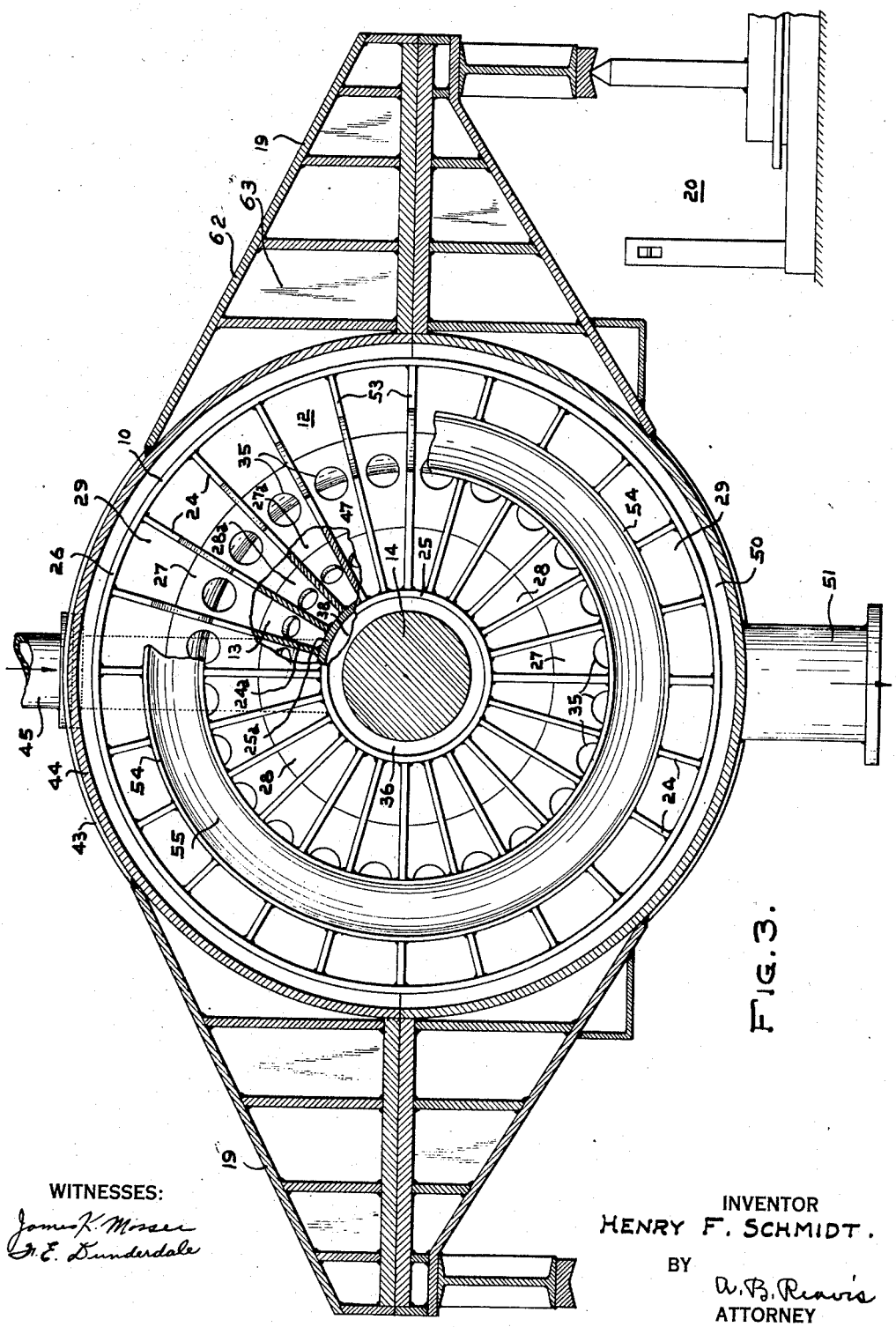
Fig. 3 is a sectional view taken along the line III—III of Fig. 2 and showing parts broken away for clearness.

Referring to Figs. 1, 2 and 3, the rotor, at 10, is connected to a spindle 14 journaled in bearings 15 and having a coupling flange 16 at one end for attachment to a prime mover or other device whose power is to be measured. The bearings 15 are carried by the casing construction, the latter having side extensions 17 connected to the bearings for this purpose, with the result that a predetermined co-axial relation is maintained between the casing and rotor constructions. The bearings 15 are supported by outer bearings 18, preferably of the anti-friction type, in turn, carried by the foundation brackets or standards 18a. The casing construction is elongated as shown at 19, 19 in Fig. 1 so that it, in effect, constitutes a beam which may be used in conjunction with a suitable scale, at 20, so that torque may be measured.

The cups or pockets 12 and 13 of the rotor and casing constructions are constituted by opposed annular channels, at 21 and 22, provided in adjacent radial faces of the rotor and casing constructions and which complementally form approximately toroidal space or spaces 23, together with vanes extending transversely of the channels and dividing each of the latter into a circumferential series of pockets.

Referring first to the pockets 12 formed in the rotor construction, they are preferably comprised by the annular channel, at 21, and the vanes 24 for sub-dividing the latter into the pockets. The channel 21 is preferably constituted by inner and outer cylindrical plate elements 25 and 26, a radial plate element 27, and inner and outer frusto-conical plate elements 28 and 29, the conical plate element 28 having its edges welded to the cylindrical plate 25 and to the radial plate element 27, at 30 and 31, respectively, and the outer frusto-conical plate element having its edges welded to the cylindrical plate element 26 and to the radial plate element 27, at 32 and 33, respectively.

In like manner, the pockets 13 of the casing construction, at 11, are preferably comprised by an inner cylindrical plate element 25a, outer cylindrical plate element 26a, a radial plate element 27a and inner and outer frusto-conical plate elements 28a and 29a having their edges welded to the cylindrical and radial plate elements in a similar manner to provide the annular channel, at 22, which is subdivided by the vanes 24a.

From the structure so far described, it will be seen that the opposed annular channels, at 21 and 22, complementally form an approximately toroidal space 23 whose cross-section is polygonal, the sides of the cross-section being constituted by the plate elements, including frusto-conical plate elements, which are welded together. Preferably the toroidal space is octagonal in cross-section, the inner and outer sides of the cross-section parallel to the spindle axis being constituted jointly by cylindrical plate elements, that is, the innermost side is constituted by the cylindrical plate elements 25 and 25a and the outermost side by the cylindrical plate elements 26 and 26a.

Where the apparatus is used as a hydraulic brake or dynamometer, the rotor construction preferably has a circumferential series of pockets 12 at each side and the casing construction has side portions provided with pockets 13 arranged in opposed relation to the rotor pockets 12, this arrangement providing for thrust balancing. In this connection, the rotor construction preferably embodies a common radial plate 27, one surface of which constitutes bottoms of pockets at the left side of the runner and the other surface of which constitutes bottoms of pockets at the right hand side. Furthermore, the common radial plate is preferably provided with openings 35 for balancing of pressures in the oppositely directed pockets.

The rotor construction may be connected to the spindle in any suitable manner. To this end, the cylindrical wall elements 25 are preferably welded to spacer rings 36, which, in turn, are welded to the spindle and the radial plate 27 is welded, at 37, to the spindle. The outer cylindrical plate 26 has sufficient axial length to constitute the outer cylindrical plate element of both sets of rotor construction pockets, the outer cylindrical plate 26 thereby constituting the rim for the rotor construction such that the latter constitutes a very strong rotating structure highly resistant to centrifugal and working stresses.

The casing construction has each of the annular radial plates 27a welded, at 38, to a ring 40 forming one member of a stuffing box or gland encompassing the spindle and it is also welded to the plate elements 17 constituting a side extension joined to a bearing 15. The outer cylindrical plates 26a of the casing construction are welded, at 42, to the radially-extending flanges 43 welded to a cylindrical plate 44 to which the beam extensions 19 are welded, the plate 44 being spaced from and encompassing the cylindrical or rim plate 26 of the rotor construction.

Liquid, for example, water, is supplied to and withdrawn from the toroidal space or spaces 23 by means of connections associated with the casing construction. To this end, there are shown inlets 45 having passages 46 communicating, by openings 47 formed in the frusto-conical plates 28a, with channels 22 for supplying water to the latter. As axial clearance spaces 48 exist between the rotor and casing constructions, it will be apparent that liquid, which flows circuitously in the pockets about the toroidal axes of the toroidal spaces formed by the complementary channels, will escape through the peripheral axial clearance formed between the rotor rim cylindrical plate 26 and the casing cylindrical plate 44, liquid entering the space 50 being discharged through the outlet 51. Thus it will be seen that continuous flow of liquid through the apparatus provides for adequate dissipation of energy without undue rise in temperature.

The vanes 24 and 24a sub-dividing the opposed annular channels 21 and 22 into the pockets 12 and 13 preferably have their exposed edges 53 and 53a strengthened by annular lashing members 54 and 54a welded to the exposed vane edges intermediately of the length thereof. Strength, lightness and stiffness of lashing is afforded by having lashing members of arcuate cross-section. This type of lashing also has the advantage that a pair of lashing members may conveniently provide a vent space 55 connected to a vent passage 56 and provide for the ready venting of air from the toroidal space and the pockets of the latter.

As the vanes 24 and 24a are arranged normal to the plane of rotation it will be apparent that the apparatus operates equally as well in either direction, with the result that it may be used to measure power irrespective of the direction of rotation of the prime mover or other apparatus which is being tested.

Referring to Fig. 4, the apparatus here shown is similar to that already described, the only essential difference being that the driving element is provided with the pockets 12 whereas the driven element has the pockets 13, the pockets 12 and 13 being formed by plate elements connected together in the manner already described. In this view, the driving shaft 58 is connected by any suitable means, for example, the fabricated structure 59, to the hydraulic coupling fabricated driving element construction provided with the annular channel 21 sub-divided by vanes 24 into a circumferential series of pockets 12. The fabricated construction providing the channel 22 sub-divided by the vanes 24a into pockets 13 is connected to the driven shaft or element 60. The driving and driven shafts or elements may be maintained in co-axial relation by any suitable means, for example, the steady bearing 61 arranged between telescopic portions of the shafts or elements. As before, fluid in the toroidal space 23 formed by the opposed channels, at 21 and 22 moves in a circuitous manner with respect to the toroidal axis, liquid moving radially outward in the pockets 12 of the more rapidly moving member and radially inward in the pockets 13 of the slower moving member. Liquid may be supplied to and discharged from the toroidal chamber in any suitable manner well-known in the art.

While the use of radial, frusto-conical and cylindrical plate elements and vanes welded together in the manner described provides a structure of adequate strength and one which may be fabricated with facility, nevertheless, as the cup or pocket bottom walls are each made up of a series of straight portions including angles, the efficiency for flow is not as good as would be the case if the cup or pocket bottom walls were curved to suit the desired flow; however, as the power absorbed increases as the fifth power of the diameter, it will be apparent that any slight impairment of efficiency on this account may be readily compensated for by a slight increase in diameter, with the result that, by the present invention, a construction has been produced which may be readily fabricated and made equally as effective as one having properly designed pocket or cup bottom walls.

Referring further to the preferred, or dynamometer embodiment, shown in Figs. 1, 2 and 3, as already pointed out, the housing comprised by the cylindrical shell 44 and which forms a part of the casing construction 11, is, in effect, a part c. the beam to which torque is applied. The beam includes arms 19 each of which is fabricated so as to be unitary with the cylindrical shell 44 and to have adequate stiffness against deflection due to the applied torque. As shown, the beam arms 19 have flanges 62 joined by stiffened web structures 63, the flanges being arranged substantially tangentially with respect to the shell 44, and converging outwardly, both the flanges and the web structures being welded to the shell 44 so that the torque of the latter may be applied to the beam arms and the latter serve the purposes indicated without the introduction of inaccuracies due to deflection.

While I have shown my invention in several forms, it will be obvious to those skilled in the art that it is not so limited but is susceptible of various other changes and modifications without departing from the spirit thereof, and I desire, therefore, that only such limitations shall be placed thereupon as are imposed by the prior art or as are specifically set forth in the appended claims.

What I claim is:

1. In a power absorbing or transmitting device of the hydraulic type, co-axial fabricated rotor and casing constructions having laterally opposed annular channels forming an approximately toroidal space for liquid, each construction including inner and outer cylindrical plate elements and a radial plate element joined by frusto-conical plate elements welded to the respective cylindrical plate elements and to the radial plate element to form its channel such that the toroidal space formed by opposed channels is polygonal in cross-section and each construction including vanes welded to the plate elements forming its channel and dividing the latter transversely into a circumferential series of pockets such that opposed pockets provide spaces for the circuitous travel or liquid about the toroidal axis under the influence of centrifugal force due to the faster moving member.

2. In a power absorbing or transmitting device, co-axial fabricated rotor and casing constructions having laterally opposed annular channels forming an approximately toroidal space, each construction including a plurality of circumferentially-extending plate elements welded together to form its channel such that the toroidal space is polygonal in cross-section with sides thereof formed by the plate elements and each construction including vanes welded to the plate elements forming its channel and dividing the latter transversely into a circumferential series of pockets such that pockets of the opposed channels provide spaces for the circuitous travel of liquid about the toroidal axis under the influence of centrifugal force due to the faster moving member, annular lashing members welded to the vanes of each channel adjacent to the exposed edges thereof and intermediately of the length of such edges, means connected to the casing construction and providing liquid supply and discharge passages for said toroidal space, the discharge passage communicating with the annular space between juxtaposed outer edges of the channels.

3. In a power absorbing or transmitting device of the hydraulic type, co-axial fabricated rotor and casing constructions arranged in side-by-side relation with clearance space therebetween, said constructions having laterally opposed annular channels forming an approximately toroidal space for liquid, each construction including inner and outer cylindrical plate elements and a radial plate element joined by frusto-conical plate elements welded to the respective cylindrical plate elements and to the radial plate element to form its channel such that the toroidal space formed by opposed channels is octagonal in cross-section and each construction including vanes welded to the plate elements forming its channel and dividing the latter transversely into a circumferential series of pockets such that pockets of the opposed channels provide spaces for the circuitous travel of liquid about the toroidal axis under the influence of centrifugal force due to the faster moving construction, and vent means communicating with the interior of said toroidal space.

4. In a power absorbing or transmitting device, co-axial fabricated rotor and casing constructions arranged in side-by-side relation with clearance space therebetween, said constructions having laterally opposed annular channels forming an approximately toroidal space, each construction including inner and outer cylindrical plate elements and a radial plate element joined by frusto-conical plate elements welded to the respective cylindrical plate elements and to the radial plate element to form its channel such that the toroidal space formed by opposed channels is octagonal in cross-section and each construction including vanes welded to the plate elements forming its channel and dividing the latter transversely into a circumferential series of pockets such that pockets of the opposed channels provide spaces for the circuitous travel of liquid about the toroidal axis under the influence of centrifugal force due to the faster moving construction, lashing members welded to the exposed edges of the vanes of each channel and arranged intermediately of the length of such edges and the lashing members of opposed channels complementally forming a vent space, means providing a vent passage communicating with the vent space, and liquid supply and discharge connections for said toroidal space.

5. In a power absorbing or transmitting device, co-axial fabricated rotor and casing constructions arranged in side-by-side relation with clearance space therebetween, said constructions having laterally opposed annular channels forming an approximately toroidal space, each construction including inner and outer cylindrical plate elements and a radial plate element joined by frusto-conical plate elements welded to the respective cylindrical plate elements and to the radial plate element to form its channel such that the toroidal space formed by opposed channels is octagonal in cross-section and each construction including vanes welded to the plate elements forming its channel and dividing the latter transversely into a circumferential series of pockets such that pockets of the opposed channels provide spaces for the circuitous travel of liquid about the toroidal axis under the influence of centrifugal force due to the faster moving construction, lashing members welded to the exposed edges of the vanes of each channel and arranged intermediately of the length of such edges and the lashing members of opposed channels complementally forming a vent space, means providing a vent passage communicating with the vent space, means connected to the casing construction and providing liquid supply and discharge passages for said toroidal space, the supply passage communicating with the channel of the casing construction and the discharge passage communicating with the annular clearance space between juxtaposed outer edges of the channels.

6. In a hydraulic dynamometer, a beam member having supporting trunnions, a spindle carried by the beam member and having its axis arranged co-axially of the trunnions, a fabricated rotor construction carried by the spindle, a fabricated casing construction carried by and forming a part of the beam member and enclosing the rotor construction, said rotor and casing constructions having laterally opposed annular channels forming a pair of approximately toroidal spaces; each construction comprising a plurality of circumferentially-extending plate elements, including frusto-conical plate elements, welded together to form its channel such that the toroidal spaces formed by opposed channels are each polygonal in cross-section and each construction including vanes welded to the plate elements forming its channel and dividing the latter transversely into a circumferential series of pockets such that pockets of the opposed channels provide spaces for the circuitous travel of liquid about the toroidal axes under the influence of centrifugal force due to movement of the rotor, and means connected to the casing construction of the beam member and providing liquid supply and discharge passages communicating with said toroidal space.

7. In a hydraulic dynamometer, a beam member having supporting trunnions, a spindle having its axis arranged co-axially of the trunnions, a fabricated rotor construction carried by the spindle, a fabricated casing construction enclosing the rotor construction and forming a part of the beam member, said casing construction having side portions spaced from the ends of the rotor construction to provide clearance spaces and said side portions of the casing construction and the ends of the rotor construction having laterally opposed annular channels forming a pair of approximately toroidal spaces, each construction including inner and outer cylindrical plate elements and a radial plate element joined by frusto-conical plate elements welded to the respective cylindrical plate elements and to the radial plate element such that each toroidal space formed by opposed channels is octagonal in cross-section and each construction including vanes welded to the plate elements forming its channel and dividing the latter transversely into a circumferential series of pockets such that pockets of the opposed channels provide spaces for the circuitous travel of liquid about the toroidal axes under the influence of centrifugal force due to movement of the rotor, means connected to the casing construction and providing liquid supply and discharge passages for said toroidal spaces, the supply passages communicating with the channels of the casing construction and the discharge passage communicating with the annular clearance spaces between juxtaposed outer edges of the channels.

8. In a hydraulic dynamometer, a beam member having supporting trunnions; a spindle carried by the beam member and having its axis arranged co-axially of the trunnion; a fabricated rotor construction carried by the spindle; a fabricated casing construction forming a part of the beam member and enclosing the rotor construction; said casing construction including side portions defining clearance spaces with respect to ends of the rotor construction and the side portions and the ends of the rotor construction having laterally opposed annular channels forming approximately toroidal spaces; each construction comprising inner and outer cylindrical plate elements and a radial plate element joined by frusto-conical plate elements welded to the respective cylindrical plate elements and to the radial plate element to form its channel such that the toroidal spaces formed by opposed channels are each polygonal in cross section and each construction including vanes welded to the plate elements forming the channels thereof and dividing each of the latter transversely into a circumferential series of pockets such that pockets of the opposed channels provide for the circuitous travel of liquid about the toroidal axes under the influence of centrifugal force due to movement of the rotor; means connected to the casing construction and providing liquid supply and discharge passages for said toroidal spaces; the supply passages communicating with the channels of the side portions of the casing construction and the discharge passage being formed by the circumferentially-extending space between the casing and rotor constructions and a conduit in communication with such space, said space communicating with the annular clearance spaces between the juxtaposed outer edges of the channels; and annular lashing members of arcuate cross-section welded to the exposed edges of the vanes of each channel intermediately of the length of such edges.

9. In a hydraulic dynamometer, a beam member having supporting trunnions; a spindle carried by the beam member and having its axis arranged co-axially of the trunnions; a fabricated rotor construction carried by the spindle; a fabricated casing construction forming a part of the beam and enclosing the rotor construction; the casing construction having side portions defining clearance spaces with respect to the ends of the rotor construction; said casing side portions and the ends of said rotor construction having laterally opposed annular channels forming approximately toroidal spaces; each construction including inner and outer cylindrical plate elements and a radial plate element joined by frusto-conical plate elements welded to the respective cylindrical plate elements and to the radial plate element to form channels such that the toroidal spaces formed by opposed channels are each octagonal in cross-section and each construction including vanes welded to the plate elements forming the channels thereof and dividing each of the channels transversely into a circumferential series of pockets such that pockets of opposed channels provide spaces for the circuitous travel of liquid about the toroidal axes under the influence of centrifugal force due to movement of the rotor construction; and liquid supply and discharge connections for said toroidal spaces; said rotor construction embodying a common radial plate element and a common outer circumferential plate element for the channels thereof and the radial plate element having openings formed therein and affording intercommunication between the toroidal spaces.

HENRY F. SCHMIDT.